Dec. 20, 1949 W. A. RAY 2,491,690
TEMPERATURE CONTROL SYSTEM
Filed July 22, 1944 3 Sheets-Sheet 1
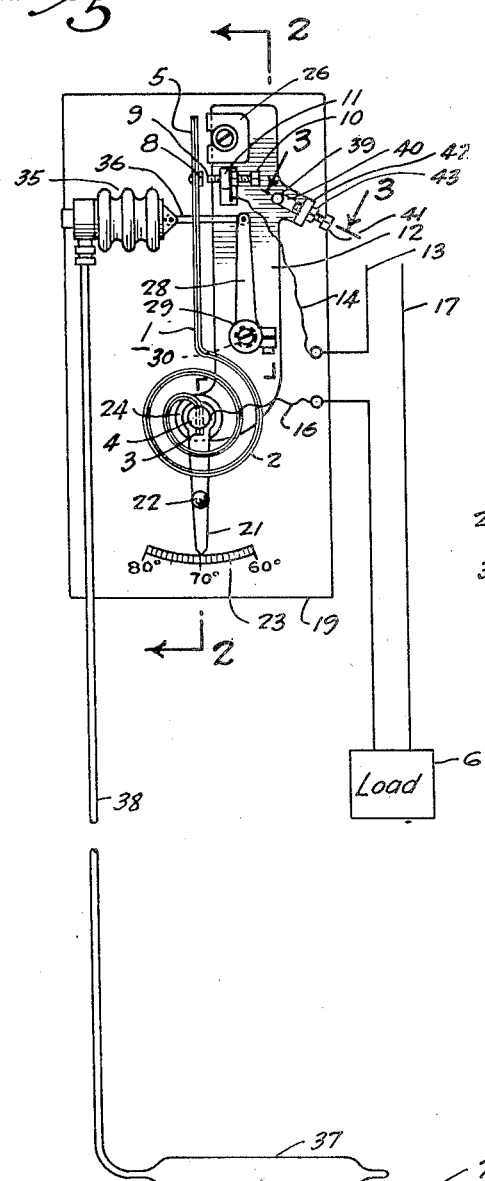
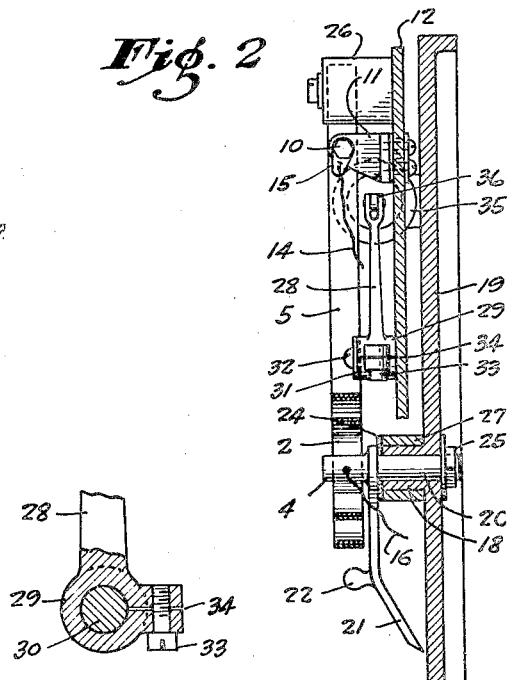
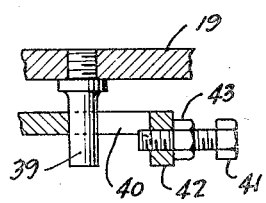
INVENTOR
William A. Ray
BY John Flann
ATTORNEY Dec. 20, 1949   W. A. RAY   2,491,690
TEMPERATURE CONTROL SYSTEM
Filed July 22, 1944   3 Sheets-Sheet 2

INVENTOR
William A. Ray
BY John Flam
ATTORNEY

Dec. 20, 1949 W. A. RAY 2,491,690
TEMPERATURE CONTROL SYSTEM
Filed July 22, 1944 3 Sheets-Sheet 3
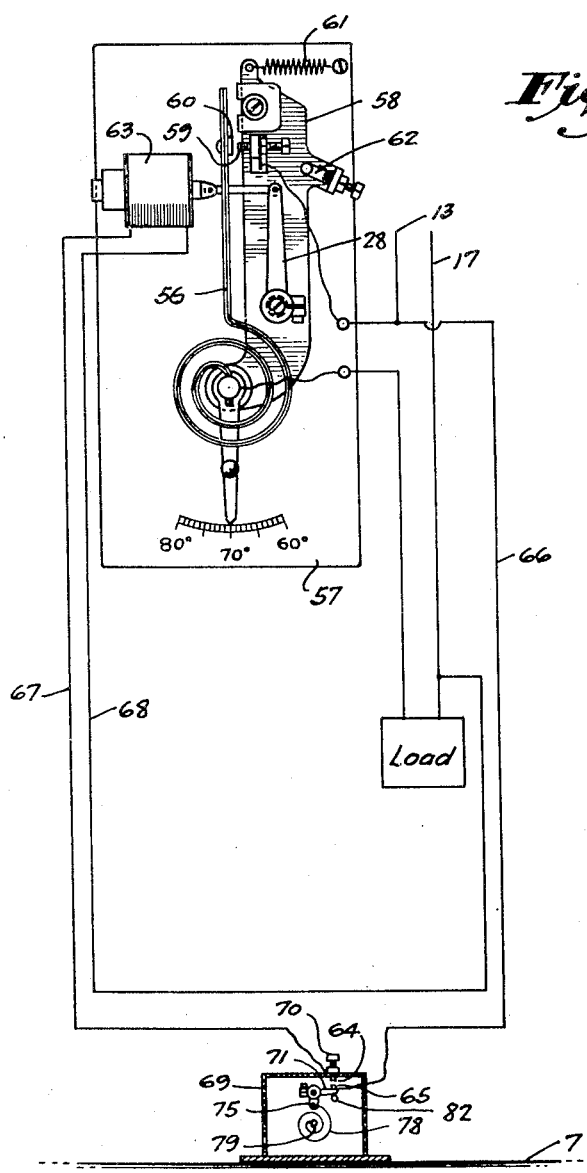
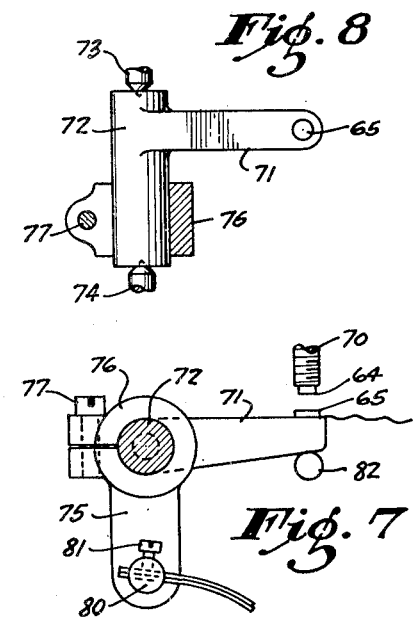
INVENTOR
William A. Ray
BY John Flam
ATTORNEY Patented Dec. 20, 1949

2,491,690

UNITED STATES PATENT OFFICE 2,491,690

TEMPERATURE CONTROL SYSTEM

William A. Ray, Glendale, Calif., assignor to General Controls Co., a corporation Application July 22, 1944, Serial No. 546,145

14 Claims. (Cl. 236—91)

1

This invention relates to a system for controlling temperature of a space. The space may be a room, a refrigerator cabinet, or the like, where it is desired to maintain the temperature between limits.

It is common for such purposes to provide a thermostat capable of initiating a control function such as opening or closing a fuel valve or a damper, or admitting liquid refrigerant to an evaporator, or regulating the consumption of electric power in an electric heating system.

These functions are all capable of attainment by rendering the thermostat responsive to the temperature where it may be located. In many instances a control responding to the temperature at one point is far from ideal, for at different levels, stratification effects are noted, due to the tendency of heated air to rise. For example, a room heater controlled by a thermostat set to turn on the heater at 69° and to turn it off at 70°, may properly function to maintain these limits in temperature at the level of the thermostat; but near the floor, the temperature may be a few degrees lower at the time the heater is turned off, and it will start to drop rapidly.

Since the feet are the first to feel changes in temperature, this stratification often results in complaints that it is cold in the room, when as a matter of fact, at the level of the thermostat, there is hardly any noticeable change in temperature. Although it has been possible to overcome these difficulties, systems that accomplish these results are quite expensive.

It is one of the objects of this invention to make it possible to reduce the effects of objectionable stratification by the aid of simple and inexpensive apparatus.

In order to accomplish this result, the thermostat is caused to be automatically adjusted in accordance with the trend or direction of change of temperature at a level different from the level of the thermostat. In heating systems, the level at which the trend or direction of change is detected is adjacent the floor level; in cooling systems, the level at which the trend is detected is adjacent the top or ceiling of the space to be cooled. In either case, the thermostat control is altered to cause counteraction of this trend. It is accordingly another object of this invention to incorporate a device compensating for the trend at a level remote from the thermostat, into the control system, to alter the response of the thermostat.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a diagram of a system incorporating the invention, the thermostat utilized therewith being shown in elevation;

Figs. 2 and 3 are enlarged sectional views taken along correspondingly numbered planes of Fig. 1;

Fig. 4 is a detail sectional view, illustrating one of the elements utilized in the thermostat;

Fig. 6 is a view similar to Fig. 1 of a further modified form of the invention;

Fig. 7 is an enlarged detail view of one of the elements utilized in the system illustrated in Fig. 6; and Fig. 8 is a partial sectional view of some of the parts illustrated in Fig. 7.

Figure 5:
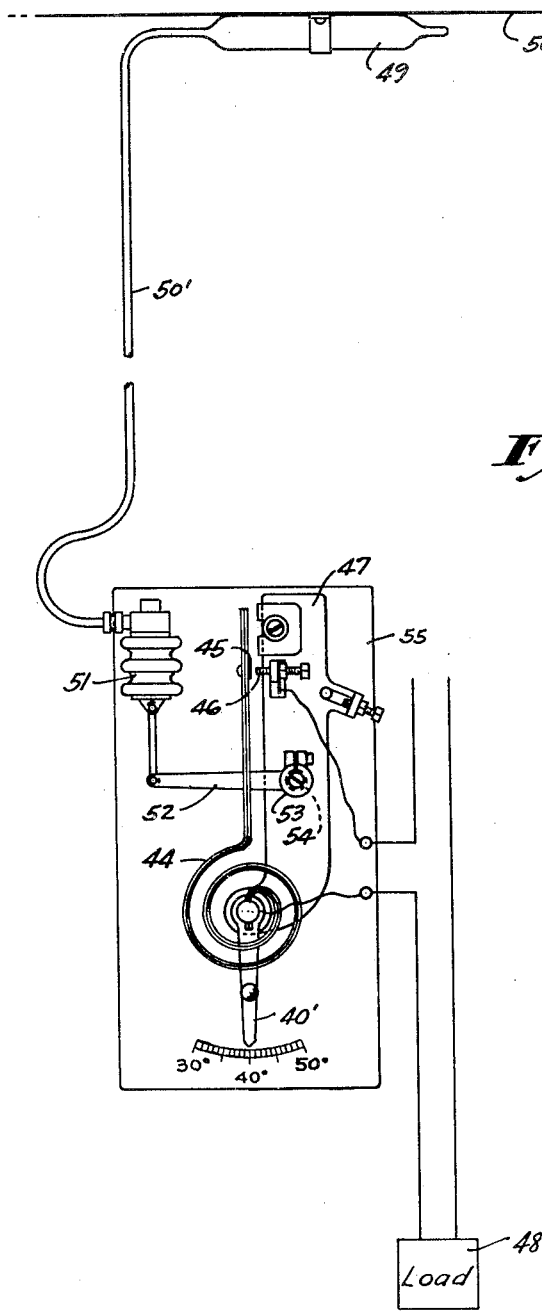
Fig. 5 is a view similar to Fig. 1, of a modified form of the invention.

In the form illustrated in Figs. 1 to 4 inclusive, a bi-metal strip 1 is utilized that is subjected to circumambient temperature, as in a room to be heated. This bi-metal strip is shown as having a spiral portion 2, the inner end 3 of which is shown as anchored in a pin 4. This pin 4 is provided with a slot into which the inner end 3 is passed. The pin 4 is appropriately supported in a manner to be hereinafter described.

The strip 1 terminates in an arm 5 which flexes in accordance with temperature changes. It is utilized to perform a controlling function, as by completing or breaking an electric circuit. The electric circuit includes a load 6 which may be an electromagnetically operated valve, or the like, that adjusts the flow of fuel to a burner in a space heating furnace, or that has the effect of otherwise altering the temperature where the thermostat 1 is located.

Such systems in general are now well known for controlling the heating of a room. The thermostat device is usually located about four or five feet above the floor level 7. The turning on or off of the source of heat, such as a gas furnace, is thus made dependent upon temperature conditions obtaining at the level of the thermostat 1.

The arm 5, in order to control an electric circuit, is provided with an electrical contact 8 which is intended to cooperate with a contact 9 provided by the end of a cap screw 10. This cap screw 10 is shown as fastened to a bracket 11 (Fig. 2) carried by a mounting 12. Appropriate insulation is provided between the bracket and the mounting.

The circuit for the controlling device 6 includes the lead 13, a connection 14, a terminal 15 carried by bracket 11, screw 10, contacts 9 and 8, thermostat 1, pin 4, connection 16, device 6, and the other lead 17. Leads 13 and 17 are intended to be connected to an appropriate source of electrical energy.

The pin 4 is mounted in a boss 18 formed integrally with a base 19 that serves as a main support for the thermostat mechanism. For this purpose, the pin 4 is shown as provided with a shank 20 that extends through the boss 18. Also formed integrally with the pin 4 is a pointer 21 manipulable as by a knob 22. This pointer 21 is shown as cooperating with a temperature scale 23 marked on the base 19. The pin 4 can be angularly adjusted by manipulation of pointer 21. This angular adjustment determines the separation between the contacts, and therefore the temperature at which the contacts are made and broken.

In order to maintain the angular adjustment of the pin 4, a frictional force is utilized. A friction washer 24 is inserted for this purpose between the right-hand face of pointer 21 and boss 18. The shank 20 has a threaded portion which is engaged by a nut 25 to maintain the shank 20 against removal and to provide sufficient friction at washer 24 to maintain the setting of pointer 21 at any adjusted position.

The pointer 21 is shown adjusted in Fig. 1 to be in co-operative relation with the 70° mark; accordingly, the thermostat is arranged to close the contacts 8 and 9 when the temperature drops but a small amount below 70° and to open the circuit when the temperature is at or near 70°.

In order to produce a quick make-and-break for the contacts 8 and 9, the mounting 12 is shown as carrying a permanent magnet 26 that co-operates with the upper end of arm 5. Since one of the two metals constituting the strip 1 is made from magnetic material, as soon as the arm 5 approaches closely enough to the poles of the magnet 26, the strip 1 is rapidly attracted and contacts 8 and 9 are made. Conversely, when the thermostat strip 5 heats, a force is produced tending to move the arm 5 away from the magnet 26; and, when it heats sufficiently, the arm 5 moves rapidly away from the magnet 26.

As thus far described, the thermostat control system quite similar to that which is in common use. In such prior systems no account is taken of the stratification at different levels. When the temperature is at or near 70° at the level of the thermostat strip 1, the temperature near the floor level may fall several degrees below that temperature. This is a well known phenomenon, and often results in complaints that the room is cold when, as a matter of fact, only the lower level is cold. This effect is often encountered when the thermostat shuts off the heat and the temperature at the lower level drops rapidly, although at the level of the thermostat, there is no appreciable cooling.

In order to ensure that the lower level will be adequately heated, provisions are made to readjust the contacts 8 and 9, and to bring them close together in response to temperature conditions adjacent the floor level. For this purpose the mounting 12 upon which the contact 9 is carried is pivotally movable with respect to the base 19. In this way, contact 9 is adjusted in response to temperature trends near the floor level. Thus, when the temperature adjacent the floor level falls below the temperature for which the strip 1 is adjusted, the mounting 12 is moved toward the left in order to bring the contacts 8 and 9 closer together, thereby energizing circuit for the control device 6 is maintained completed even after the temperature at the level of the thermostat exceeds that at which point 21 is set. However, as soon as the temperature at or near the floor level begins to rise, reversal in the direction of temperature change causes the mounting 12 to move toward the right to make it easier for the thermostat to open the circuit. Thus the device is responsive to the sign of the rate of change of temperature at the floor level 7.

The manner in which the mounting 12 is operated will now be described. The mounting 12 is shown as provided with a boss 27 that is rotatably mounted upon the boss 18 of the base 19. For moving the mounting 12, an arm 28 is provided (see Fig. 4). This arm 28 is provided with a split hub 29 that embraces a pin 30 carried by the mounting 12. The washer 31 and screw 32 threaded into the pin 30 serves to restrain axial movement of the hub 29. Furthermore, by sufficient tightening of the screw 33 that extends across the split 34 of the hub 29, a slipping clutch is provided between the pin 30 and hub 29. The degree of friction between these two elements may be controlled by manipulation of screw 33.

In order to operate the arm 28, use is made of a metal bellows 35 that is mounted on the base 19. The movable end wall of bellows 35 is connected as by a link 36 with the arm 28. The bellows 35 is made sensitive to temperature changes at or near the floor level by the provision of a sealed space in which a readily volatilizable fluid is enclosed. For this purpose a feeler bulb 37, carrying the volatile material, is shown connected as by a conduit 38 with the bellows 35. This feeler bulb 37 is disposed at or near the floor level 7. When the temperature at the floor level is decreasing, the bellows 35 contracts, arm 28 is moved toward the left, and mounting 12 is moved correspondingly. Conversely, when the temperature at the floor level is increasing, the bellows 35 expands, arm 28 is moved toward the right, and mounting 12 is moved correspondingly.

The extent of movement is limited, and further contraction or expansion of bellows 35 beyond these limits merely causes the hub 29 to slip with respect to pin 30. The limits of the movement in this case are provided by a slot-and-pin connection between the base 19 and the mounting 12. This is shown to best advantage in Figs. 1 and 3.

The base 19, for this purpose, carries a pin 39 which projects through a slot 40 formed in the mounting 12. The free movement of mounting 12 can be adjusted by the aid of an abutment screw 41 which is threaded in a boss 42 carried by the mounting 12. The adjustment can be maintained by the aid of a check nut 43.

The mode of operation of the system may now be summarized. When the temperature adjacent the floor level is rising (positive time rate of change of temperature) or is at a level corresponding to the setting of pointer 21, the mounting 12 is in the position illustrated. Contact 9 has moved as far to the right as permitted by the left-hand end of slot 40. Under these conditions, the thermostat strip 1 operates to make and break the contacts 8 and 9 to maintain the temperature at or about 70°.

Now, if the temperature at or near the floor level decreases (negative time rate of change of temperature), this trend is immediately effective to cause a contraction of bellows 35. The arm 28 is pulled toward the left, and mounting 12 moves with it. This movement is limited by contact of the abutment screw 41 with pin 39, further decrease in temperature merely causing slipping between hub 29 and pin 30. This movement prolongs the periods of engagement between contacts 8 and 9, since contact 9 is moved closer to contact 8. Accordingly, additional heat will be supplied to cause the temperature at or near the floor level to rise.

Just as soon as the temperature begins to rise, the bellows 35 operates, and the mounting 12 is moved toward the right. Should the temperature at or near the floor level continue to rise, even after the pin 39 is engaged, the hub 29 will merely slip with respect to the pin 30.

This additional control is equivalent to a temporary adjustment of the pointer 21 in one direction or the other, depending upon the direction of temperature change at or near the floor level. If the floor level is cool, the resultant effect is the same as when arm 21 is moved to a higher temperature setting. When the floor level temperature is increasing, the resultant effect is the same as if arm 21 were moved back to the original temperature setting.

The angular adjustment of mounting 12 is equivalent, as heretofore stated, of an adjustment of pointer 21. Thus, to provide the equivalent of a change in the thermostat setting of 1°, the floor temperature must change by a value that may be greater or less than 1°, depending upon the particular installation. In some instances, it may even be advisable to maintain the contacts in engagement in this manner even when the normal turn-off point, determined by the setting of pointer 21, is exceeded.

In the system just described, the thermostat control is provided for heating a space. However, the same principle of operation may be employed for a thermostat control in which a space is to be cooled, as in a refrigerating cabinet, or the like. Such an arrangement is illustrated in Fig. 5.

In this figure, the bi-metal strip 44 is shown as responding to an increase in temperature for moving contact 45 into engagement with contact 46. This contact 46, as before, is carried by a mounting 47 pivotally supported in the same manner as mounting 12 in the form just described.

The contacts 45, 46 serve to control load 48, which may be a valve for admitting refrigerant to an evaporator, or the like. As before, the pointer 40' serves to adjust the temperature at which the system is to be maintained.

In this instance, the temperature trend at a level higher than the level of the thermostat is used for the supplemental control. For this purpose, a feeler bulb 49 is disposed adjacent the ceiling 50 of the space under control. This feeler bulb is connected by a conduit 50' to the bellows 51. Bellows 51, upon expansion, serves to operate the arm 52 to move the mounting 47 in a counter-clockwise direction, thereby bringing contact 46 toward contact 45. A slip clutch arrangement, including the hub 53 and pin 54, is provided and is similar to that described in connection with the system illustrated in Fig. 1.

When the temperature near the tube 50 decreases, the bellows 51 contracts and the mounting 47 is moved toward the right. The normal relationship between contacts 45 and 46 is thus re-established. Limits, as before, may be placed upon the movement of the mounting 47 as by the slot-and-pin connection between the mounting 47 and the base 55.

In both the forms thus far described, use is made of a volatile liquid that creates a gas pressure corresponding to the temperature to which a feeler bulb is subjected. Furthermore, in both forms, the reversal in the direction of change of temperature at a level remote from the level of the thermostat is utilized to affect the spacing of the controlling contacts.

It is, however, not essential that a feeler bulb be used. In the temperature responsive device in the form illustrated in Fig. 6 an electric control is utilized.

In this form of the invention, the bi-metal strip 56 is shown as mounted in the same manner as the bi-metal strip 1 of Fig. 1. The base 57 supports the strip, as well as the mounting 58 that carries the contact 59. This contact 59 co-operates with the contact 60 carried by strip 56. Arm 28, as before, is connected through a slipping connection with the mounting 58, and a slot-and-pin connection shown generally at 62 imposes a limit upon the movement of mounting 58.

In this case a tension spring 61 is utilized to urge the mounting 58 to the normal position illustrated. In order to move the mounting 58 toward the left in response to temperature conditions adjacent the floor level, use is made of an electromagnet 63. This electromagnet is energized when the temperature adjacent the floor level starts to decrease, that is, when the rate of change of temperature becomes negative. When this occurs a circuit energizing electromagnet 63 is closed by the aid of contacts 64 and 65. When these contacts are in engagement, the circuit for electromagnet 63 is completed through lead 13, connection 66, contacts 65 and 64, connection 67, electromagnet 63, and connection 68, back to the opposite lead 17.

The manner in which the contacts 64 and 65 are operated may be best described in connection with Figs. 7 and 8.

The upper contact 64 is mounted on the end of an adjustable contact post 70 fastened to the top of the screen or casing 69. The lower contact 65 is carried on an arm 71 that is formed integrally with a pin 72. This pin 72 is appropriately mounted for rotation, as by the aid of the conical bearing pins 73 and 74.

Mounted upon the pin 72 is an operating arm 75 having a split hub 76 which is tightened upon the pin 72 as by the aid of a screw 77. This split hub, with the pin 72, forms a slipping clutch connection.

For actuating the arm 75, a temperature responsive device is utilized, such as the bi-metal strip 78, wound in a spiral about a stationary pin 79. The outer end of the spiral is connected to the arm 75 by the aid of a slotted pin 80 carried by arm 75. A set screw 81 may be used to tighten the bi-metal strip in the pin 80.

The bi-metal strip 78 tends to expand or unwind when it is cooled. Accordingly, when the strip 78 cools, it operates to move the arm 75 in a counter-clockwise direction and to bring contacts 64 and 65 together. Further cooling merely causes the arm 75 to slip on the pin 72.

Upon reversal of the trend, that is, upon an increase in temperature or when the rate of change of temperature becomes positive at or near the floor level, the bi-metal strip 75 winds up and moves the arm 75 in a clockwise direction to separate contacts 64 and 65, causing de-energization of magnet 63 and consequent return of the mounting 58 to the normal position.

In order to prevent too great a separation of the contacts 64 and 65, a stop pin 82 is provided for the arm 71.

The mode of operation of this system is substantially the same as that of the system illustrated in Fig. 1. Any reversal in the direction of temperature change at or near the floor level will cause energization or de-energization of magnet 63. Consequently, the contact pointer 59 will be moved closer to contact 60 when the temperature is decreased and will be moved farther from contact 60 when the temperature is increased.

The inventor claims:

1. In a system for controlling the temperature of a space: a thermostat comprising a pair of cooperating control members, one of said members being movable in accordance with variations in temperature; movable means for supporting the other of said members; and means responsive only to an initiation of the reversal of temperature trend at a level in said space remote from the level of the thermostat for moving the said movable means.

2. In a system for controlling the temperature of a space: a pair of members adapted to be placed in co-operative relation for initiating a temperature controlling function when the members attain a definite relative position, one of said members being movable in accordance with variations in temperature of that member; a movable mounting for the other member; means imposing a limit on the movement of said mounting; and means responsive only to an initiation of the reversal of temperature trend at a level in said space remote from the level of the members, for moving said movable mounting between the imposed limits to alter the relative position of the members for counteracting said trend.

3. In a system for controlling the temperature of a space: a bi-metal strip; a pair of contacts, one of said contacts being carried by the strip; a movable mounting for the other contact for rendering it possible to alter the temperature at which the contacts are placed in engagement; and means responsive only to an initiation of the reversal of temperature trend at a level in said space remote from the level of the strip for moving said mounting to alter the spacing of the contacts.

4. In a system for controlling the temperature of a space: a bi-metal strip; a pair of contacts, one of said contacts being carried by the strip; a base providing an anchor for the strip; a mounting pivotally supported on the base, and carrying the other contact; a slot-and-pin connection between the mounting and the base to limit the movement of the mounting; and means for moving the said mounting only upon initiation of the reversal of temperature trend at a level remote from said strip.

5. In a system for controlling the temperature of a space: a bi-metal strip; a pair of contacts, one of said contacts being carried by the strip; a base providing an anchor for the strip; a mounting pivotally supported on the base, and carrying the other contact; a slot-and-pin connection between the mounting and the base to limit the movement of the mounting; and means for moving the said mounting only upon initiation of the reversal of temperature trend at a level remote from said strip, said means comprising a feeler bulb at said remote level; a bellows connected to the bulb, and a slip clutch connection between the bellows and the mounting.

6. In a temperature control system: a bi-metal strip; a pair of contacts, one of said contacts being carried by the strip; a base providing an anchor for the strip; a mounting pivotally supported on the base, and carrying the other contact; a slot-and-pin connection between the mounting and the base to limit the movement of the mounting; and means responsive to temperature changes at a level remote from the level of the strip for moving said mounting, comprising a temperature responsive device at the said remote level, and movable in accordance with temperature changes, a contact arm, a slip clutch between said device and the arm, a contact co-operating with said contact arm, an electromagnet controlled by the contacts that are operated by the slip clutch, and a slip clutch connection between the electromagnet and the mounting.

7. In a system for controlling the temperature of a space: a frame; a bi-metal strip; a pair of contacts, one of said contacts being carried by the strip; a movable mounting for the other contact for rendering it possible to alter the temperature at which the contacts are placed in engagement; a feeler bulb, a bellows connected to the bulb, a pin and slot connection between said frame and said mounting, and a slip clutch connection between the bellows and the mounting.

8. In a temperature control system: a bi-metal strip; a pair of contacts, one of said contacts being carried by the strip; a movable mounting for the other contact for rendering it possible to alter the temperature at which the contacts are placed in engagement; and means responsive only to initiation of the reversal of temperature trend occurring at a level remote from the level of the strip for moving said mounting to alter the spacing of the contacts, comprising an electromagnet, a pair of relatively movable contacts, means imposing a limit on the displacement of said contacts, and means for closing or opening said contacts according to the sign of the rate of change of temperature at said remote level, comprising a slip clutch and temperature responsive means at said level for operating said slip clutch.

9. In a temperature control device: a bi-metal strip having a coiled portion terminating in an arm; a contact carried by the arm; a base having an apertured boss; a pin rotatably supported by aid of the aperture in the boss and anchored to the inner end of the coiled strip; a mounting pivotally carried on the exterior of the boss; and another contact co-operating with the contact on the arm, and carried by the mounting.

10. In a system for controlling the temperature of a space: a control thermostat located in said space; and means responsive only to initiation of the reversal of temperature trend at a level different from that of the thermostat, for altering the operation of the thermostat in a manner to tend to counteract said trend.

11. In a device for controlling the temperature of a space: a thermostat; a movable support; a pair of contacts, one of which is mounted upon the thermostat and the other upon the said movable support; means adjusting the relative spacing of said contacts; a slot-and-pin connection limiting the degree of said adjustment; and a slip clutch to cause movement of said support only upon initiation of the reversal of temperature trend occurring at a locality remote from said thermostat.

12. In a device for controlling the temperature of a space: a base, a temperature responsive element mounted on said base; a mounting movable with respect to said base; a pair of cooperating electrical contacts, one of which is disposed on said element, and the other of which is secured to said mounting; temperature responsive means at a level remote from said element; and means linking said temperature responsive means to said mounting for moving said mounting and the contact thereon according to the sign of the time rate of change of temperature at said remote level.

13. In a system for controlling the temperature of a space: a thermostat comprising a pair of cooperating control members, one of said members being movable in accordance with variations in ambient temperature; a movable support upon which the other of said members is mounted; means imposing limits upon the movement of said support; and a slip clutch mechanism having means moving said support between said limits to vary the relative spacing between said members according to the direction of temperature trend at a level remote from said thermostat.

14. In a system for controlling the temperature of a space: a thermostat comprising a pair of cooperating control members, one of said members being movable in accordance with variations in ambient temperature; a movable support upon which the other of said members is mounted; means imposing limits upon the movement of said support; and means for causing movement of said support between said limits to vary the relative spacing between said members according to the direction of temperature trend at a level remote from said thermostat, comprising a slip clutch, means movable according to the absolute temperature at a level remote from said thermostat, and a member connecting said slip clutch and said movable means.

WILLIAM A. RAY.

REFERENCES CITED

The following references are of record in the file of this patent:

UNITED STATES PATENTS

| Number | Name | Date |
|---|---|---|
| 557,272 | Johnson | Mar. 31, 1896 |
| 1,785,787 | Rayfield | Dec. 23, 1930 |
| 1,876,636 | Dicke | Sept. 13, 1932 |
| 1,891,536 | Henning | Dec. 20, 1932 |
| 1,953,923 | Bulley | Apr. 10, 1934 |
| 2,025,097 | Dougherty | Dec. 24, 1935 |
| 2,032,041 | Beck | Feb. 25, 1936 |
| 2,181,427 | Grant | Nov. 28, 1939 |